United States Patent
Lamy-Bergot

(10) Patent No.: US 9,480,094 B2
(45) Date of Patent: Oct. 25, 2016

(54) METHOD FOR IMPROVING THE HF BAND LINK ESTABLISHMENT USING A BROADBAND CAPABILITY

(71) Applicant: THALES, Neuilly-sur-Seine (FR)

(72) Inventor: Catherine Lamy-Bergot, Gennevilliers (FR)

(73) Assignee: THALES, Courbevoie (FR)

( * ) Notice: Subject to any disclaimer, the term of this patent is extended or adjusted under 35 U.S.C. 154(b) by 153 days.

(21) Appl. No.: 14/339,372

(22) Filed: Jul. 23, 2014

(65) Prior Publication Data

US 2015/0031375 A1    Jan. 29, 2015

(30) Foreign Application Priority Data

Jul. 25, 2013 (FR) ..................... 13 01791

(51) Int. Cl.
 H04W 72/00    (2009.01)
 H04W 76/02    (2009.01)
 H04L 5/06     (2006.01)
 H04W 16/02    (2009.01)

(52) U.S. Cl.
 CPC .............. *H04W 76/023* (2013.01); *H04L 5/06* (2013.01); *H04W 16/02* (2013.01)

(58) Field of Classification Search
 CPC ........... H04W 72/005; H04W 76/005; H04W 72/10; H04W 28/18; H04W 16/14; H04W 36/30; H04W 16/02; H04W 16/10; H04W 16/12; H04W 28/20; H04W 48/12; H04W 72/04; H04W 72/0446; H04W 72/0453; H04W 16/18; H04W 72/1226; H04W 72/1257
 USPC ........................................................ 455/450
 See application file for complete search history.

(56) References Cited

U.S. PATENT DOCUMENTS

| 7,180,970 B1 | 2/2007 | Warnagiris |
| 8,897,283 B2 * | 11/2014 | Seo .................... H04W 72/1289 370/343 |
| 2014/0169199 A1 | 6/2014 | Lamy-Bergot |

FOREIGN PATENT DOCUMENTS

| EP | 2418892 A1 | 2/2012 |
| EP | 2458770 A1 | 5/2012 |
| EP | 2744263 A1 | 6/2014 |

* cited by examiner

*Primary Examiner* — Kwasi Karikari
(74) *Attorney, Agent, or Firm* — Baker & Hostetler LLP

(57) ABSTRACT

A method for improving the HF band link establishment in a communication system including one or more transmit terminals and one or more receive terminals, at least one of the terminals having a broadband capability, comprises the following steps: creating call bands and listening bands according to the broadband transmit and/or receive capabilities, the minimum number of bands being suitable for covering the entire frequency plan; minimizing the number of bands and then maximizing the number of frequencies in each of these bands of size B; distributing the bands $B_i$ in time by arranging the bands in descending cardinal-value order, and allocating a frequency $f_j$ to each band $B_i$; transmitting/receiving in broadband mode, by checking that the selected transmit frequencies are not already in use.

14 Claims, 8 Drawing Sheets

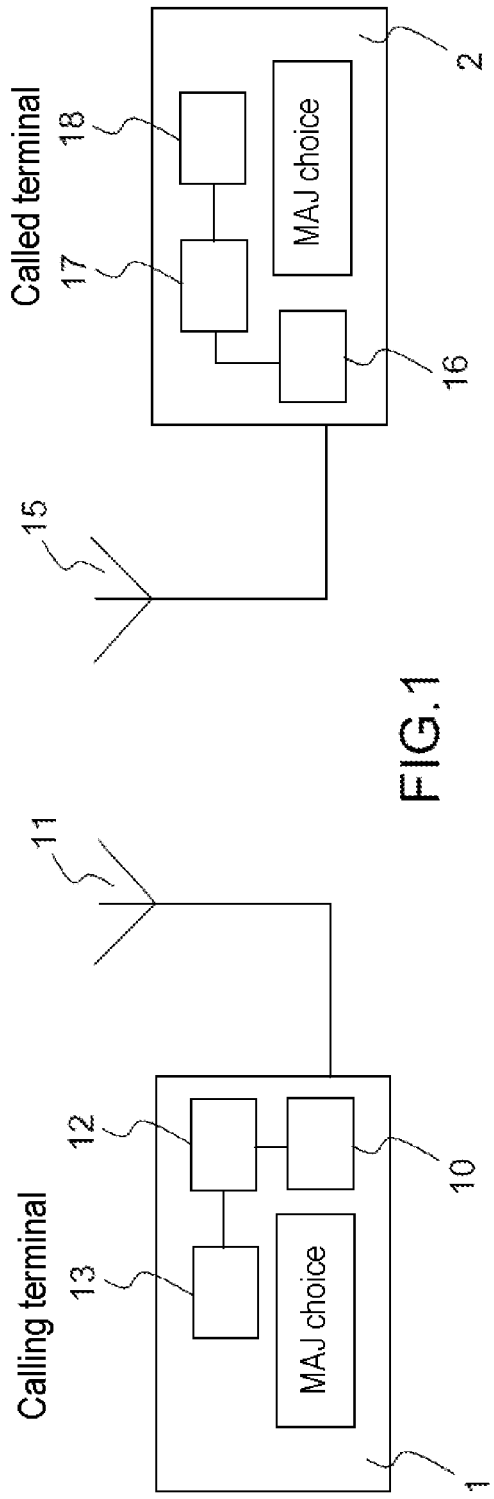
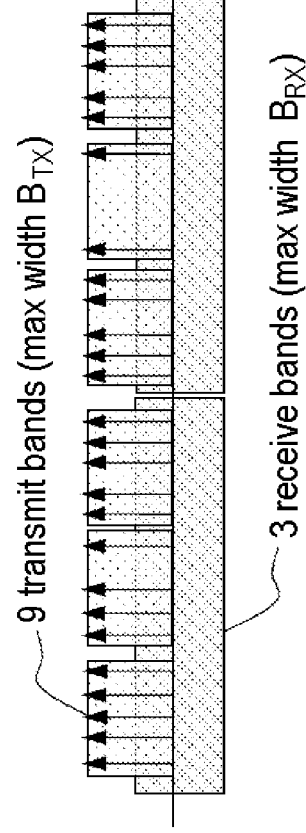

METHOD FOR IMPROVING THE HF BAND LINK ESTABLISHMENT USING A BROADBAND CAPABILITY

CROSS-REFERENCE TO RELATED APPLICATION

This application claims priority to foreign French patent application No. FR 1301791, filed on Jul. 25, 2013, the disclosure of which is incorporated by reference in its entirety.

FIELD OF THE INVENTION

The invention relates to a method for improving the high frequency band or HF band link establishment using a broadband capability, i.e. higher than the useful band of the communication signal. It is used for the link establishment between HF terminals, of which at least the calling terminal or called terminal has a broadband transmit or receive capability and wishes to use this capability to speed up its connection while remaining compatible with current solutions working with narrowband radio terminals, typically in the class of several kHz or even several tens of kHz (comparable to the modulations normally used on this frequency band which often have a width of 3 kHz).

The method is used, for example, to implement a narrowband link establishment (typically on a 3 kHz channel) corresponding to the current capabilities for setting up a low-speed and medium-speed link or to speed up the narrowband connection phase proposed for very high speed terminals such as those described in the patent application of the applicant EP 2 744 263. It applies to the protocol layer.

BACKGROUND

In the field of HF communications, HF links offer notably a beyond-the-horizon capability, better known by the acronym BLOS (Beyond Line of Sight), which enables the implementation of long-distance or very long distance communications without the need to use a satellite or relay stations. One of the problems posed in these communications is knowing how to speed up the link establishment in synchronous mode or in asynchronous mode in order to offer a shorter link establishment time and therefore a greater ease of use for the user, and/or a faster service. A plurality of techniques are described in the prior art that speed up connections for these two modes.

For example, in the case of an asynchronous link, the aforementioned patent application of the Applicant recommends the implementation of parallel monitoring on the receiver side.

Another improvement consists in adopting a synchronous link establishment, i.e. based on a common time reference, or coordinated universal time (UTC) or through the sharing of a time reference provided by a master clock on the network. The synchronous method is considered to be the most effective to date. This solution has improved the link establishment time, in the context of generally low to medium network load. Since a standard narrowband terminal automatically adheres to the synchronous monitoring plan by definition, it does not seem possible to propose significant improvements in this technique, except:

1) by reducing the number of frequencies of the plan, since the synchronous solution gives an average connection time proportional overall to the number of frequencies of the plan concerned, 2) by carrying out multiple listening in the same time increment. Patent EP 2 418 892 implements a link establishment with a bandwidth expanded from 6 to 24 KHz based on a frequency $F_0$.

The techniques currently offered by the prior art have different disadvantages.

In the case of asynchronous solutions, there is a convergence time problem when substantial frequency plans are involved, since the call duration is proportional to the number of frequencies of the plan. Lower performance may also occur under low to medium load compared with a synchronous method.

In the case of synchronous 3G solutions, the known techniques do not result in an identified potential gain, except by reducing the number of frequencies. In this case, however, there are fewer possible frequencies, with a risk of not being able to establish the link or "no link establishment" if the frequencies are non-passing, are already in use or are affected by interference.

The multiple-listening solution in the same time increment yields no gain in synchronous mode, since the transmitter transmits on one frequency only. The resulting disadvantages are a risk of loss of sensitivity of the broadband receiver in the presence of interfering transmitters or for the call.

In the description below, the term "legacy" refers to a historic system or standard based on single-band transmissions (or through combination of a plurality of adjacent bands), for example, or, more generally, narrowband transmissions (i.e. several kHz to several tens of kHz). The calling terminal corresponds to the communication terminal or device which initiates the call request. The called terminal is the terminal that receives this call request.

SUMMARY OF THE INVENTION

The method according to the invention is based notably on the fact of introducing a broadband capability into the communication system in the transmission and/or reception, organising the frequency plan during the task preparation to take account of the transmit and receive bandwidths, making use of this broadband transmit and receive capability during the link establishment phase (Automatic Link Establishment (ALE)).

The invention relates to a method for improving the HF band link establishment in a communication system including one or more transmit terminals or calling terminals and one or more receive terminals or called terminals, at least one of the calling or called terminals having a broadband capability, characterized in that it comprises at least the following steps:

creating call bands and listening bands according to the broadband transmit and/or receive capabilities, the number of frequencies of the plan being known, the minimum number of bands being suitable for covering the entire frequency plan, minimising the number of bands and then maximising the number of frequencies in each of these bands $B_i$ of size B, distributing the bands $B_i$ regularly in time in order to minimise the intermediate listening time between two frequencies, possibly at available temporal positions close to a regular subdivision, and allocating a frequency $f_j$ to each band $B_i$ in order to define a standard frequency plan for the operation of the system, transmitting/receiving in broadband mode, by checking that the selected transmit frequencies are not already in use.

According to one embodiment, the bands are distributed by arranging them in descending cardinal-value order and placing the bands in frequency positions defined by $$i + \left\lfloor k \times \frac{F}{\text{card}(B_i)} \right\rfloor$$

or in a free position as close as possible to this value, where F is the number of frequencies of the frequency plan, i is an index that varies from 1 to t number of defined bands, k varies from 0 to $K_{i-1}$, where $K_i$ is the number of frequencies in the band $B_i$.

According to one embodiment, when the frequency bands overlap, the bands are distributed by prioritising the bands with the highest cardinal value. According to another alternative embodiment, the bands with the lowest cardinal values are distributed.

The steps of the method according to the invention are carried out for the calling and called terminals.

In the case of a broadband transmit and receive application, it is imposed that each narrowest frequency band, located on the transmit (or respectively the receive) side is contained in the broadest band located on the receive (or respectively the transmit) side.

In the case of an asynchronous link establishment and a broadband capability in the calling terminal, a prediction phase, for example, is applied in order to scan the frequency plan according to the highest probability of the frequencies being available.

According to one embodiment, the calling terminal has a broadband transmit capability and, after a listening phase with transmission (or LBT: Listen Before Transmit) on a band $B_i$, the calling terminal transmits its call over all of the card($B_i$) frequencies fk present in the transmit band $B_i$.

According to another embodiment, the called terminal also has a broadband capability and, having detected a plurality of call frequencies, it determines the frequency on which it will reply by choosing the highest-quality frequency or the frequency that is recommended in the use of the system.

In the case of a synchronous call with a narrowband calling terminal, a capability to switch over to transmit on a different frequency is introduced if the current frequency is not available.

In the case of a synchronous call with a broadband calling terminal, the method transmits, for example, simultaneously on a plurality of frequencies found to be free during the LBT listening phase in the transmit band including the standard synchronous frequency.

The method may comprise a mechanism for switching over to transmit on a different band not including the unavailable standard synchronous frequency.

According to one embodiment, the called terminal also has a broadband capability and, after having detected a plurality of call frequencies, it determines the frequency on which it will reply by choosing the highest-quality frequency or the frequency that is recommended in the use of the system.

BRIEF DESCRIPTION OF THE DRAWINGS

Other characteristics and advantages of the method according to invention will become evident from a reading of the description of an embodiment given by way of illustration and in no way limiting, with the attached figures, in which:

FIG. 1 shows a calling terminal and a called terminal,

FIG. 3 shows a representation of the possible subdivisions for the transmit terminal and the receive terminal.

DETAILED DESCRIPTION

Figure 2:
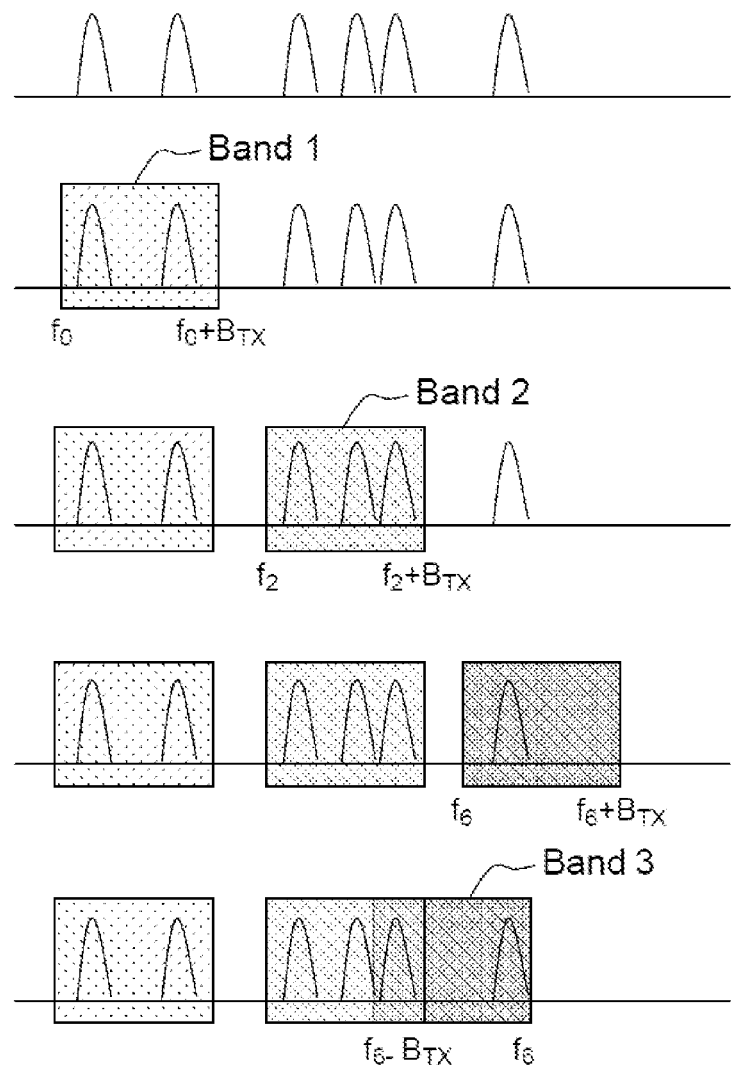
FIG. 2 shows a representation of frequency bands.

The example of the implementation of the method according to the invention, also referred to below as ALE XL, is given in the case of a system including one or more transmit terminals having a broadband transmit capability and one or more receive terminals having a broadband receive capability. The bandwidth of the terminal is greater than the bandwidth of the channel. The method may, however, be used if only the transmit terminal has a broadband capability, or only the receive terminal has a broadband capability.

The example that follows is given in the case of a communication system including at least one calling terminal 1 and at least one called terminal 2. The calling terminal includes a transmitter 10 coupled to an antenna 11 and a first modem 12 and a microprocessor 13 incorporating the controller. The called terminal 2 includes a second antenna 15, a receiver 16 coupled to the second antenna, followed by a second modem 17 and a second microprocessor 18 incorporating the second controller. The terminals may be communication devices or HF radio terminals.

In the example given above for carrying out the method according to the invention, it is assumed that the calling terminal initiates the opening of the communication which manages the set-up and maintenance of the call.

During the system planning, the frequency plan (set S of authorised frequencies) is chosen and the calling terminal knows the frequencies on which it can transmit.

The method according to the invention comprises a step 1A, consisting in creating call bands and listening bands according to the capabilities of a given receive terminal RX (broadband case) or transmit terminal TX (broadband case).

The method will minimise the number of bands of size B and maximise the number of frequencies per band. The method is shown in FIG. 2. It is assumed that S={$f_1, \ldots f_F$} all of the F frequencies of the plan arranged in ascending order. It is assumed that $B_{TX}$ and $B_{RX}$ are the respective transmit and receive bandwidths of the broadband terminals. In principle, $B_{TX} \leq B_{RX}$, since it is easier to implement a broadband receive radio terminal than a broadband transmit radio terminal, it will therefore be assumed below that this example is given as illustrative and in no way limiting, and the subdivision of the plan into bands of maximum bandwidth $B_{TX}$ will first be considered. If $B_{TX} \leq B_{RX}$ applies, it suffices to perform an inversion and begin with the subdivision into bands of $B_{RX}$. A first search for bands is carried out by scanning the plan according to ascending frequencies: the first band, $B_0$, is defined as $[f_0, f_0+B_{TX}]$. In the case of the other bands, iteratively, the following band can then start with $h_i$ the next frequency in the set S higher than $f_0+B_{TX}$. However, since the aim is to have the maximum number of frequencies, an attempt is made to apply a possible readjustment mechanism, seeking to increase the number of frequencies in the band: it is assumed that $h_j$ is the highest frequency in the band $[h_i, h_i+B_{TX}]$. The following band $B_1$ is then defined as a band such as $[h_j-B_{TX}, h_j]$ or equally a band centred around the frequencies of S including the same number of frequencies of S as $[h_j-B_{TX}, h_j]$. This procedure is therefore continued until the last frequency of S is reached. This mechanism is shown in FIG. 2 for the third band. The same search is then carried out by scanning the plan according to descending frequencies. This gives two possible band definitions, and the configuration requiring the lowest number of bands or, if the numbers are equal, the configuration comprising the highest number of frequencies of S repeated in two bands is retained as the final plan.

When the frequency plan includes gaps with a width greater than or equal to the width of the size $B_{TX}$ of the band, the frequency plan will be treated as a corresponding number of independent frequency sub-plans.

At the end of this step 1B, there are $n_T$ bands with a width $B_{TX}$:$B_i$ i=1 . . . $n_T$.

The following step, 1C, consists in distributing the bands $B_i$ in time to minimise the intermediate listening time between two frequencies. The bands Bi are distributed regularly in time, at available temporal positions close to a regular subdivision.

One way to proceed consists, for example, in distributing the bands $B_i$ in time by arranging the bands $B_i$ in descending cardinal-value order. Each band $B_i$ is placed in temporal positions corresponding to a frequency value, the positions being defined in the following manner $$i + \left\lfloor k \times \frac{F}{K_i} \right\rfloor$$

or to the available close integers, where $\lfloor x \rfloor$ is the integer closest to x, F is the number of allocated frequencies, i is an index that varies from 1 (first band chosen with the highest cardinal value) to t number of defined bands, $K_i$ is the number of frequencies in the band $B_i$, and k=0 . . . $K_{i-1}$. The aim of the band arrangement is to increase the regularity of the sets with the highest cardinal values.

A frequency $f_j$ is allocated to each instance of the bands $B_i$, which defines the standard frequency plan applicable to the narrowband case. In particular, with a current terminal, this will be a plan equivalent to that of the narrowband-only mode.

An example is given below to illustrate the principle implemented by the method according to the invention.

FIG. 2 shows three bands, $B_1$ ($K_1$=card($B_1$)=2, including $f_1$ and $f_2$), $B_2$ ($K_2$=card($B_2$)=3, including $f_3$, $f_4$ and $f_5$), $B_3$ ($K_3$=card($B_3$)=2, including $f_6$ and $f_7$) and F=7 the number of frequencies.

Arrangement in descending cardinal-value order therefore gives $B_2$-$B_1$-$B_3$, thus providing a distribution over the 7 listening frequencies
for $$1 + \left\lfloor k \times \frac{F}{\text{card}(B_2)} \right\rfloor = 1 + \left\lfloor k \times \frac{7}{3} \right\rfloor = \{1; 3; 6\}$$

band B2 is placed on positions 1, 3 and 6.

| $B_2$ | — | $B_2$ | — | — | $B_2$ | — |
|---|---|---|---|---|---|---|
| Position 1 | Position 2 | Position 3 | Position 4 | Position 5 | Position 6 | Position 7 | then for $$2 + \left\lfloor k \times \frac{F}{\text{card}(B_1)} \right\rfloor = 2 + \left\lfloor k \times \frac{7}{2} \right\rfloor = \{2; 5\},$$

band B1 is placed on 5.

| $B_2$ | $B_1$ | $B_2$ | — | $B_1$ | $B_2$ | — |
|---|---|---|---|---|---|---|
| Position 1 | Position 2 | Position 3 | Position 4 | Position 5 | Position 6 | Position 7 | then for $$3 + \left\lfloor k \times \frac{F}{\text{card}(B_3)} \right\rfloor = 3 + \left\lfloor k \times \frac{7}{2} \right\rfloor = \{3; 6\},$$

since the positions found are already occupied, band B3 is placed on the available positions closest to the values found, i.e. 4 and 7.

| $B_2$ | $B_1$ | $B_2$ | $B_3$ | $B_1$ | $B_2$ | $B_3$ |
|---|---|---|---|---|---|---|
| Position 1 | Position 2 | Position 3 | Position 4 | Position 5 | Position 6 | Position 7 |

In addition to the band placement, the nominal frequency plan is also defined for the synchronous case, this plan being shared by the calling terminal and called terminal, defined either during the task preparation, or updated using the terminals' own means when that can be done without risk of deviation between the terminals, or updated via broadcasting by a network master terminal. This frequency plan describes what a narrowband terminal listens to. Logically, the F frequencies are scanned by taking, for each band, one of its frequencies, for example according to the order of the frequencies in their band. It should be noted that the effect of distribution of the bands automatically mixes the frequencies in a regular manner which is important when some frequencies are passing frequencies and others are not. The final result in this example is as follows:

| $B_2$ | $B_1$ | $B_2$ | $B_3$ | $B_1$ | $B_2$ | $B_3$ |
|---|---|---|---|---|---|---|
| $f_3$ | $f_1$ | $f_4$ | $f_6$ | $f_2$ | $f_5$ | $f_7$ |
| Position 1 | Position 2 | Position 3 | Position 4 | Position 5 | Position 6 | Position 7 |

In the particular case where the bands overlap, as shown in FIG. 2, the calculation method must be adapted since the sum of the cardinal values of the different bands is always greater than F. The value Ki is not the cardinal value of $B_i$, but is calculated in the case of an overlap using two methods. The first method consists in prioritising the bands with the highest cardinal values in such a way as to speed up the link establishment on the frequencies located in these bands, at the expense of the more isolated frequencies. The second method consists in prioritising a performance equalisation, by accepting a loss on some frequencies which could have been speeded up. The first method enables the display of shorter average times but longer maximum times, while the second method risks adversely affecting the average time, but by reducing the maximum times. It is up to the organiser of the network to choose his method. In all cases, it involves defining how to calculate the positions and determining the distribution of the K according to the cardinal values of the bands. In all cases, the bands are allocated their own frequencies, and it then remains to allocate the shared frequencies. In the first method, the bands with the highest cardinal values will be given priority, whereas, in the second method, the bands with the lowest cardinal values will be given priority.

Thus, returning to the example shown in FIG. 2, the first method yields $K_1=2$, $K_2=3$ and $K_3=1$ and the second method $K_1=2$, $K_2=2$ and $K_3=2$. This results in the following two implementations:

| $B_2$ | $B_1$ | $B_3$ | $B_2$ | $B_1$ | $B_3$ |
|---|---|---|---|---|---|
| $f_3$ | $f_1$ | $f_5$ | $f_4$ | $f_2$ | $f_6$ |
| Position 1 | Position 2 | Position 3 | Position 4 | Position 5 | Position 6 |

Vs

| $B_2$ | $B_1$ | $B_2$ | $B_1$ | $B_2$ | $B_3$ |
|---|---|---|---|---|---|
| $f_3$ | $f_1$ | $f_4$ | $f_2$ | $f_5$ | $f_6$ |
| Position 1 | Position 2 | Position 3 | Position 4 | Position 5 | Position 6 |

If the transmission and reception are "broadband" and if the transmit bandwidth $B_{TX}$ differs from the receive bandwidth $B_{RX}$, this produces two band subdivisions, wherein each narrowest band must always be contained entirely or not at all in a largest band. The aim here is to simplify the adaptation and listening mechanisms in parallel, since every set of frequencies in the narrowest band, for example the transmit (or respectively receive) band, forms part of the same receive (or respectively transmit) band. This subdivision for the widest bands is easily carried out by transposing the mechanism previously described for the subdivision into bands in relation to frequencies in the case of bands with a width (for example if $B_{RX}>B_{RX}$) $B_{RX}$ in relation to bands with a smaller width $B_{TX}<B_{RX}$.

FIG. 3 shows diagrammatically this case with 9 transmit bands for the width $B_{TXmax}$ and 3 receive bands with a maximum width $B_{RX}$.

According to one alternative embodiment, it is possible to recalculate a new frequency plan and increase the number of frequencies listened to which are passing and available if there is information on frequencies that are not available, for example frequencies already in use, non-passing frequencies or even frequencies that would be reserved for specific uses (for example emergency calls). This calculation can be carried out by each calling or called terminal, for itself locally, or can be broadcast by a master terminal in the network.

The first step, step 1, consisted in creating call bands and listening bands according to broadband transmit and/or receive capabilities. At the end of this step, the result is therefore $B_i$, $i=1 \ldots t$ bands on the transmit side, each containing card($B_i$) frequencies with $$\sum_{i=1}^{t} \text{card}(B_i) \geq F,$$

where F is the cardinal value of S, and Cj, $j=1, \ldots, r$ on the receive side, each containing card(Cj) frequencies with $$\sum_{j=1}^{r} \text{card}(C_j) \geq F.$$

The second step, step 2, involves the speeding up of the link establishment. A distinction will be made between the synchronous case and the asynchronous case.

In the case of an asynchronous call, where the broadband capability is on the receive side, with a narrowband transmission, has already been dealt with in the context of the patent application of the applicant EP 2 744 263. The method applies to the case where the broadband capability is provided on the transmit side (calling terminal) and only optionally on the receive side (called terminal). The calling terminal remains under a minimum-duration call constraint which is linked to the scanning of the narrowband receive frequency plan of the called terminal.

A first option for speeding up the link establishment consists in applying a prediction phase enabling scanning of the frequency plan according to the highest probability of the frequencies being passing/unoccupied. This phase can be implemented either on the basis of recommendations provided by prediction tools, for example VOACAP (Voice of America Coverage Analysis Program), or link quality evaluations carried out during preceding communications, or finally external information, for example derived from monitoring phases, or information broadcast by a possible network master terminal.

A second option, which may be combined with the first, consists in using the broadband transmit capability on the calling terminal side. The calling terminal will successively scan the different bands B, and, for each one, will start with a listening phase (also referred to as LBT: Listen Before Transmit) intended to detect the frequencies already occupied. It will then transmit its call on all of the card($B_i$) frequencies fk located in this transmit band $B_i$ and unoccupied. This number of frequencies depends on the allocated frequency plan and is between 1 and F, where F is the number of frequencies of the transmission plan. A narrowband receive terminal picks up only one frequency in each listening time slot, but multiplies its chances of establishing the link by the number of co-located transmit frequencies.

If the called terminal also has a broadband capability, after having detected a plurality of call frequencies, the called terminal determines the frequency on which it will reply by choosing the highest-quality frequency or the frequency that is recommended in the use of the system.

Figure 4:
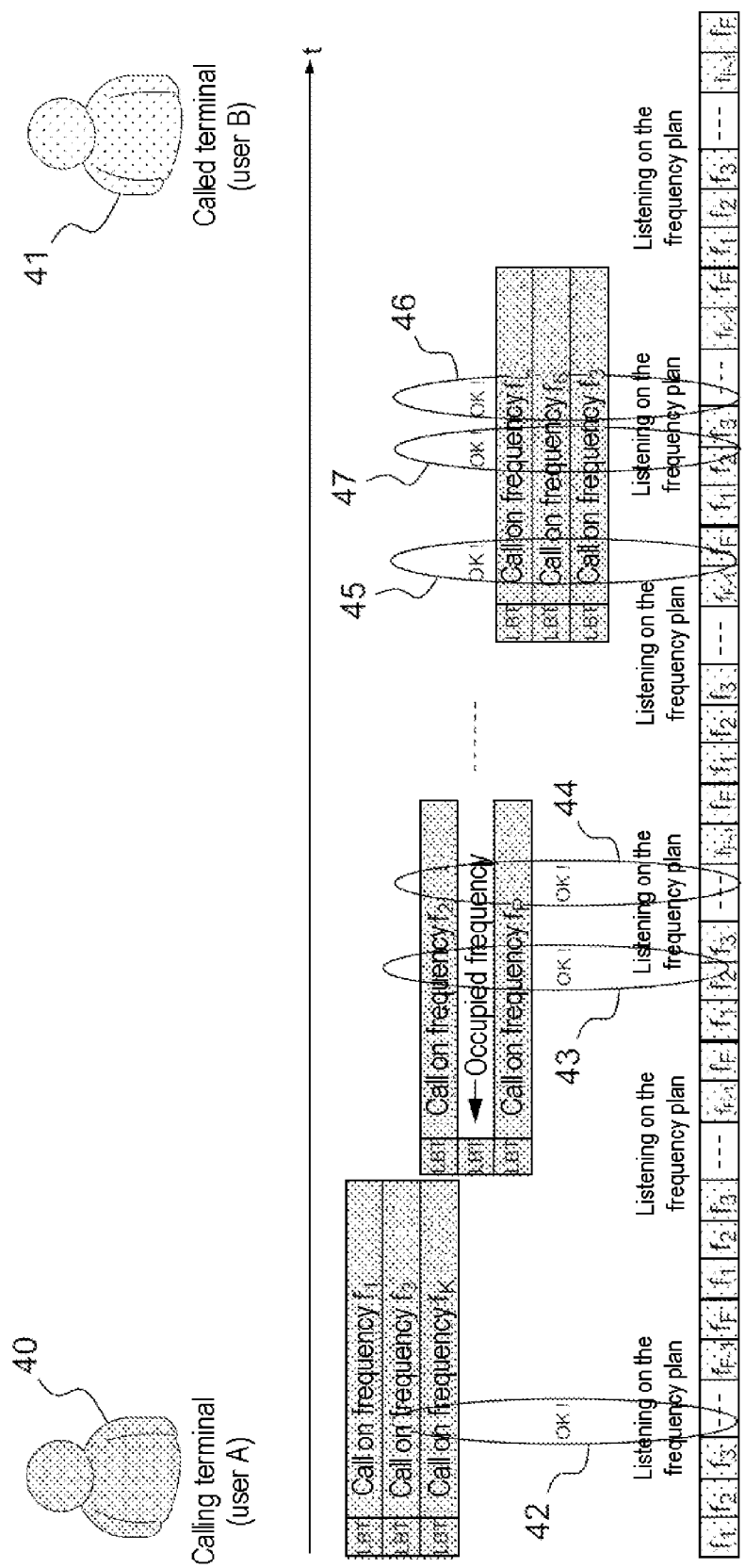
FIG. 4 shows a calling and listening diagram for a broadband transmit terminal and a narrowband receive terminal.

FIG. 4 shows a diagram of this type. By way of example, this figure shows a plurality of points where the communication can be established (point indicated by OK!). Thus, in a first time interval, the calling terminal 40 transmits a call on the frequency $f_1$, a call on the frequency $f_3$, and a call on the frequency $f_K$, while the called terminal or receiver 41 listens on the frequency plan. In FIG. 4, the called terminal can receive the call on the frequency $f_3$, 42, or receive 43, 44 the call on the frequency $f_2$, or on the frequency $f_p$, then finally can receive 45, 46, 47, the frequencies $f_L$, $f_6$ or $f_3$. It is evident that, when the LBT detects a frequency in use, the transmitter does not transmit on all of the frequencies present in the call band $B_i$.

Figure 5:
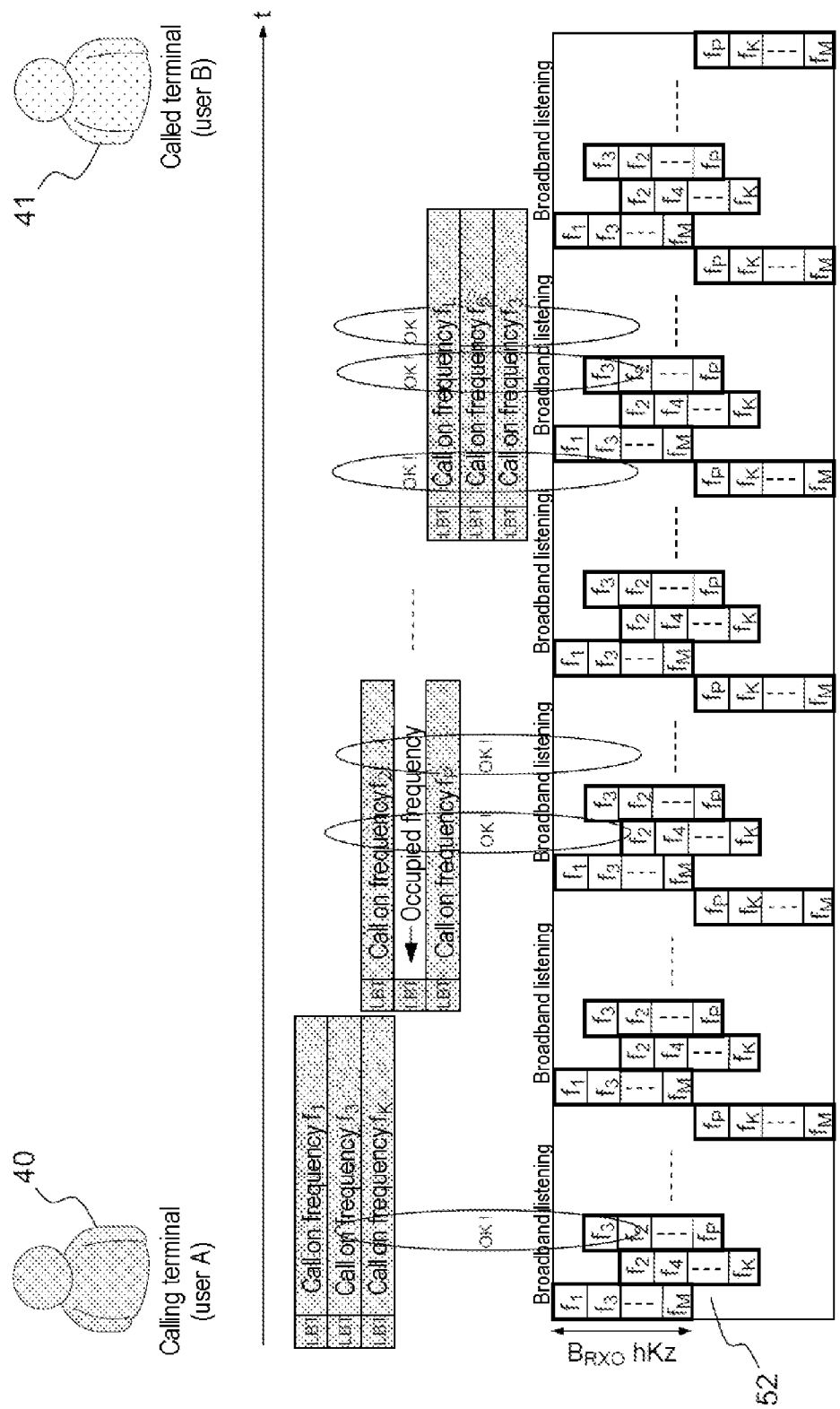
FIG. 5 shows a calling and listening diagram for a broadband transmit terminal and a broadband receive terminal.

A broadband receive terminal will have the capability to listen in parallel to the different transmissions of the transmit terminal and choose to reply on one of the frequencies. For example, it may choose to reply on the highest-quality frequency, the frequency that forms part of the recommended frequencies, a frequency originating from a random choice, etc., according to a choice principle known to the person skilled in the art. The frequency judged by the receive terminal as having the highest quality is selected by default. This therefore offers a capability to select not only a frequency more quickly, but also a higher-quality frequency. FIG. 5 shows an example of operation between the broadband calling terminal 40 and a broadband called terminal 41 in the case of an asynchronous call. The called terminal has a broadband band $B_{RX}$ and listens in parallel on a plurality of frequencies. For example, it will listen, 52, on the frequencies $f_1, f_3, \ldots, f_M$, to the call transmitted by the calling terminal on the frequency $f_1$, the call transmitted on the frequency $f_3$, the call transmitted on the frequency $f_K$ and so on. Using the method according to the invention, the called terminal is therefore capable of listening over a wider band than the traditional narrowband and therefore picking up a plurality of frequencies in parallel. The number of frequencies listened to depends on the allocated frequency plan, is equal to card($C_j$) and is between 1 and F.

Figure 6:
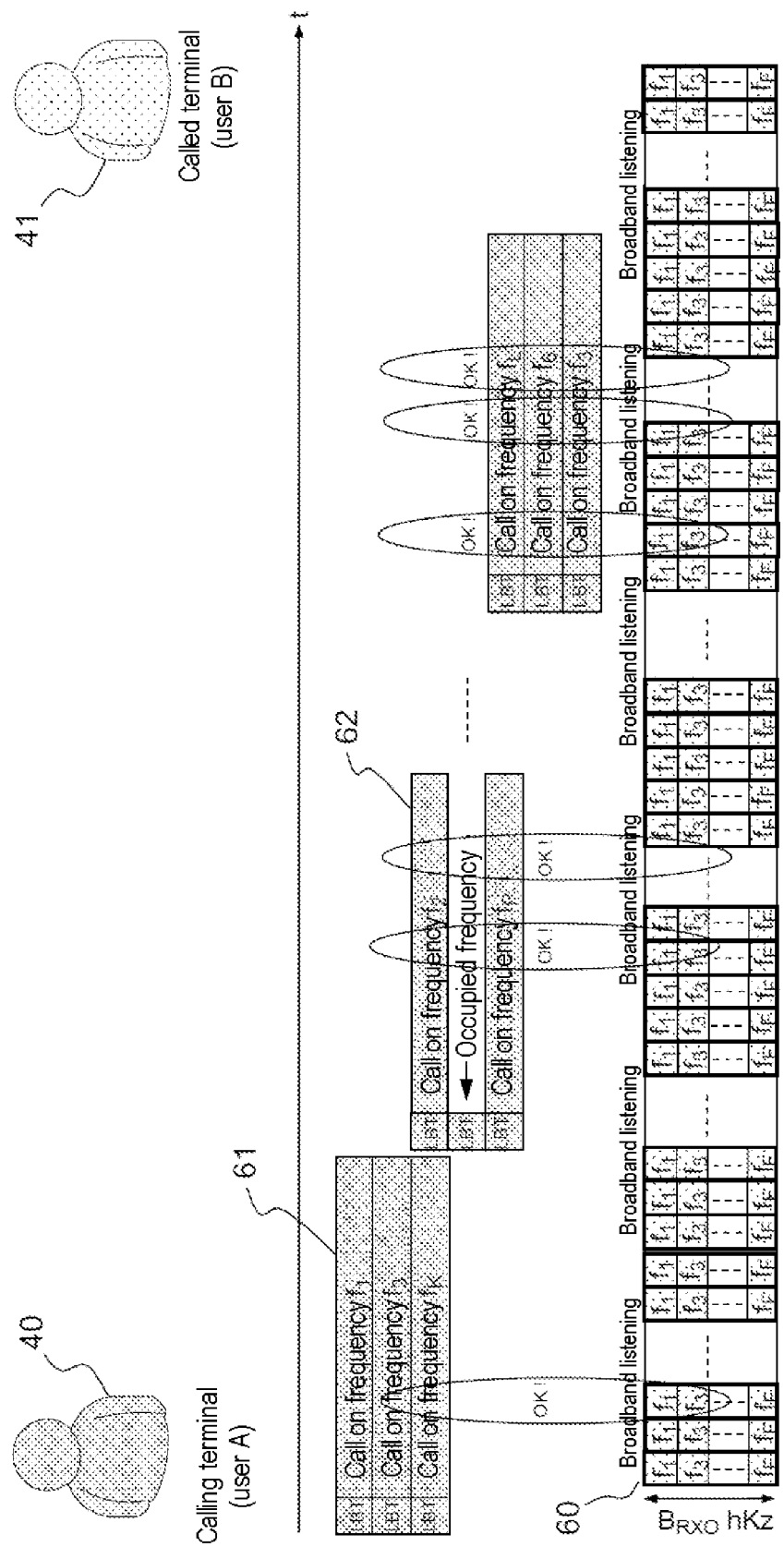
FIG. 6 shows a calling and listening diagram for the case of a broadband receive terminal covering the entire authorised frequency plan.

If the receive band $B_{RX}$ is greater than or equal to the total band, including all of the F frequencies of the plan, the broadband listening is continuous, 60, as shown in FIG. 6. The receiver covers all of the frequencies of the plan and, as shown in FIG. 6, it is evident that the receiver listens on all of the frequencies $f_1, \ldots, f_F$, to the calls shown by the first group $f_1, f_3, f_K$, 61, the second group $f_1, f_5, f_P$, 62, and so on.

In one particular case where, in the task preparation phase, it is known that the terminals of the network will all be broadband at least in receive mode, the duration of the asynchronous call can be reduced by taking account of the broadband receive capability, which will allow the average link establishment time to be speeded up.

If a synchronous link establishment is considered, different alternative embodiments can be implemented. It must be remembered that the synchronisation phase is indicated in FIGS. 7 to 9 for the record, since it may take place previously, or may be absent, as, for example, when the terminals all have a UTC source.

Figure 7:
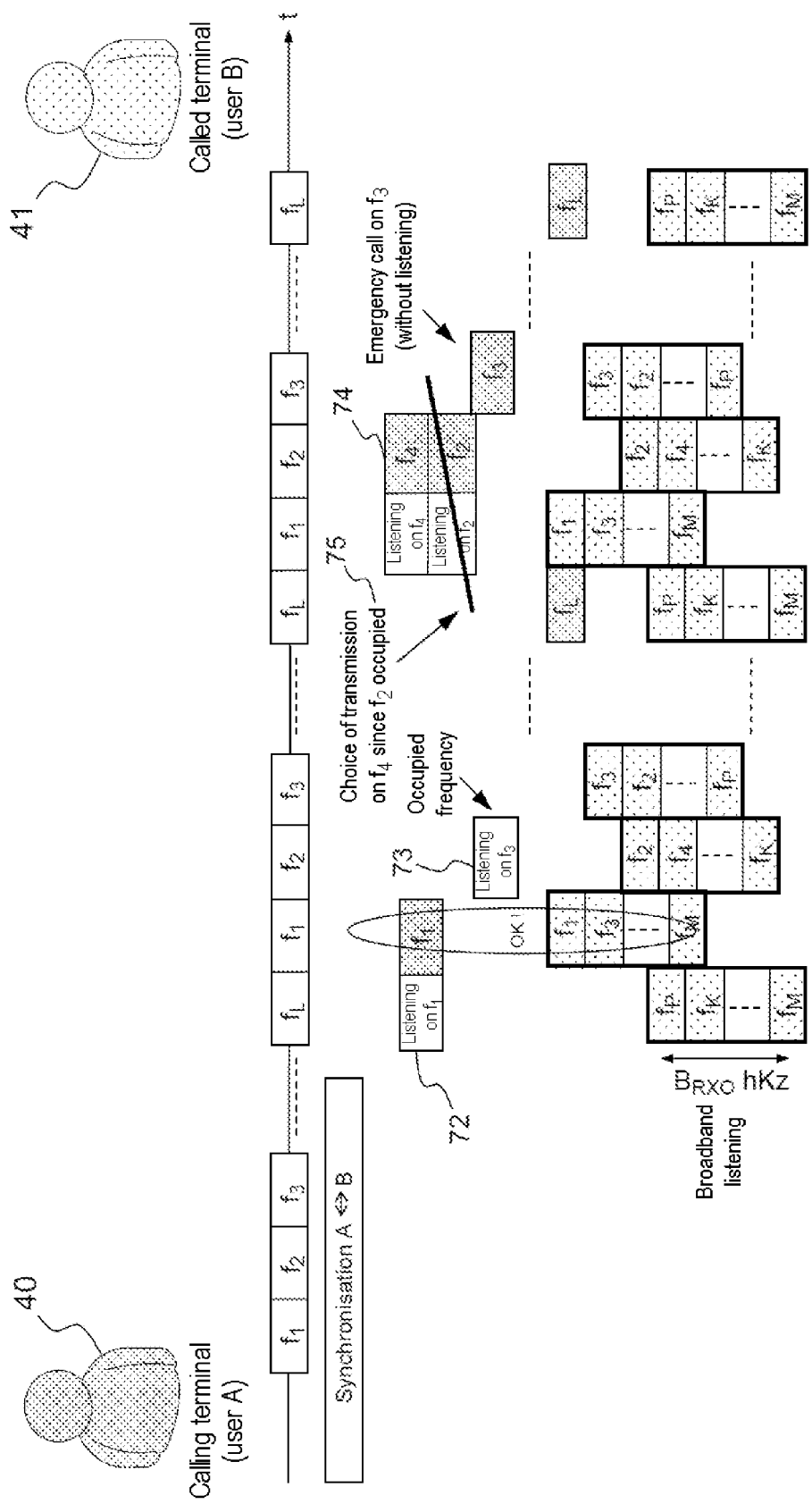
FIG. 7 shows a diagram in the case of a synchronous 3G call.

FIG. 7 shows schematically a first alternative comprising a narrowband transmission channel, calling user 40, who calls successively and according to the plan on the frequencies $f_1, f_2, f_3$ and $f_L$, in each case after a prior listening phase on the frequency in order to avoid interfering inadvertently with a frequency already in use. Only urgent/priority call cases can generally do without an LBT phase of this type. The calling terminal 40, listens, 72 on a first frequency $f_1$, then transmits on the frequency $f_1$. The called terminal 41, listens in broadband mode on a band $B_i$. The calling terminal listens, 73, on $f_3$ and, if $f_3$ is occupied, it does not transmit in the following time slot. It will then have two options (not shown in the figure): either it chooses to wait to continue normally for the next following slot to listen to $f_5$ before transmitting on it, or it will proceed immediately to listen on $f_4$ with a view to transmitting on $f_4$. If the terminal has advance knowledge of the fact that a frequency is not available, for example because it has listened to it very recently, or because a prediction tool has indicated that the frequency was not a passing frequency, or, finally, possibly because it has obtained this information from a different terminal, the calling terminal will be able to decide not to carry out the planned actions of listening on $f_i$ then transmitting on $f_i$, but to switch over to a different frequency $f_j$ provided that $f_j$ belongs to the same receive band as $f_i$. In fact, a narrowband receive terminal will not be disadvantaged since $f_i$ is not in any case usable, and a broadband receive terminal will be able to listen to $f_j$ and therefore potentially reply if this frequency is free and of quality. For example, the figure shows that, after having listened, the calling terminal notes that the frequency $f_2$ is occupied 75, and it will therefore transmit on the frequency $f_4$ which is available 74. As previously, emergency calls are authorised without listening.

If the called terminal has a broadband listening capability, after having detected a plurality of call frequencies, the called terminal determines, for example, the frequency on which it will reply by choosing the highest-quality frequency or the frequency that is recommended in the use of the system.

Figure 8:
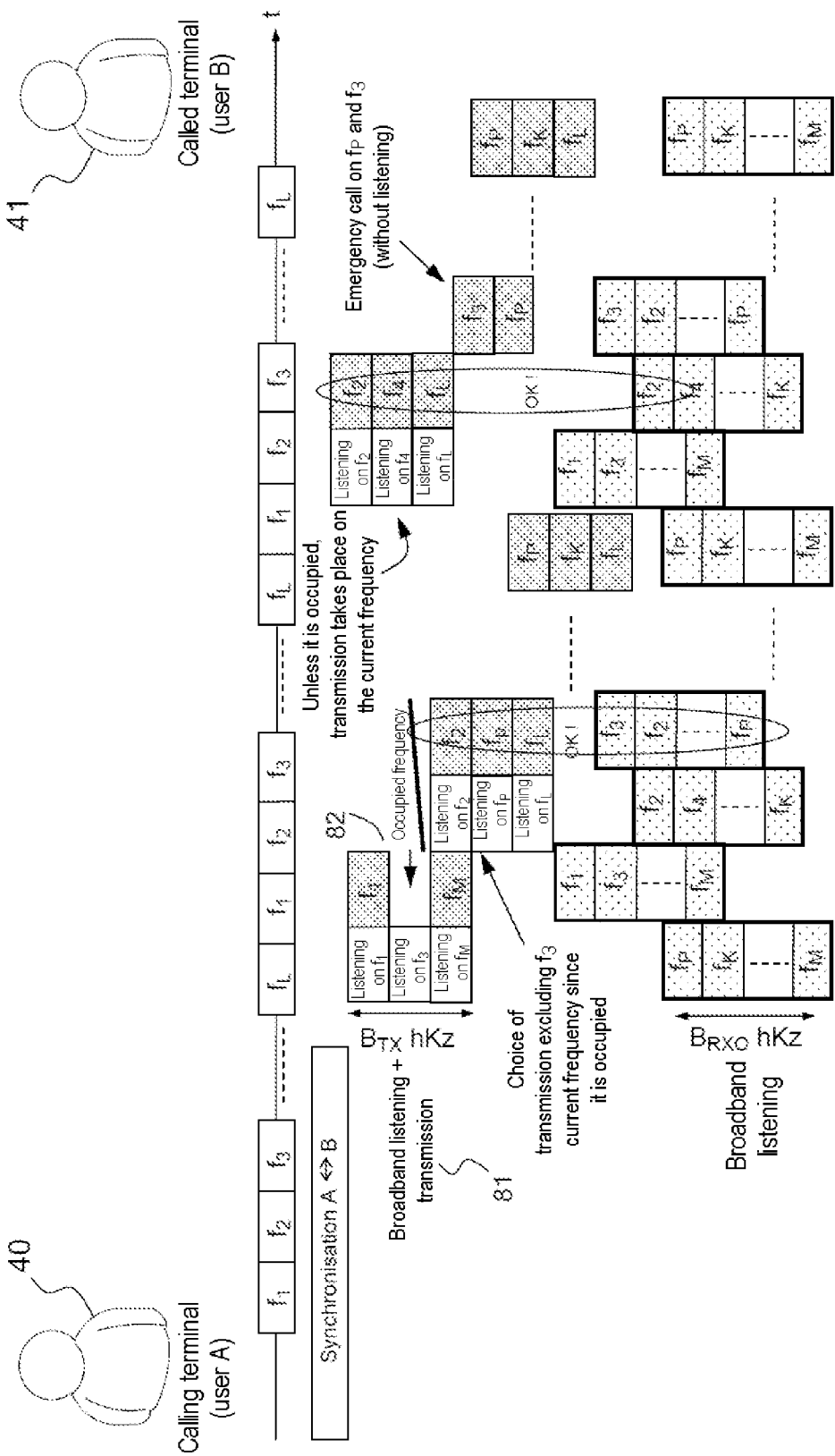
FIG. 8 shows a basic diagram of the call in ALE XL in a synchronous solution.
Figure 9:
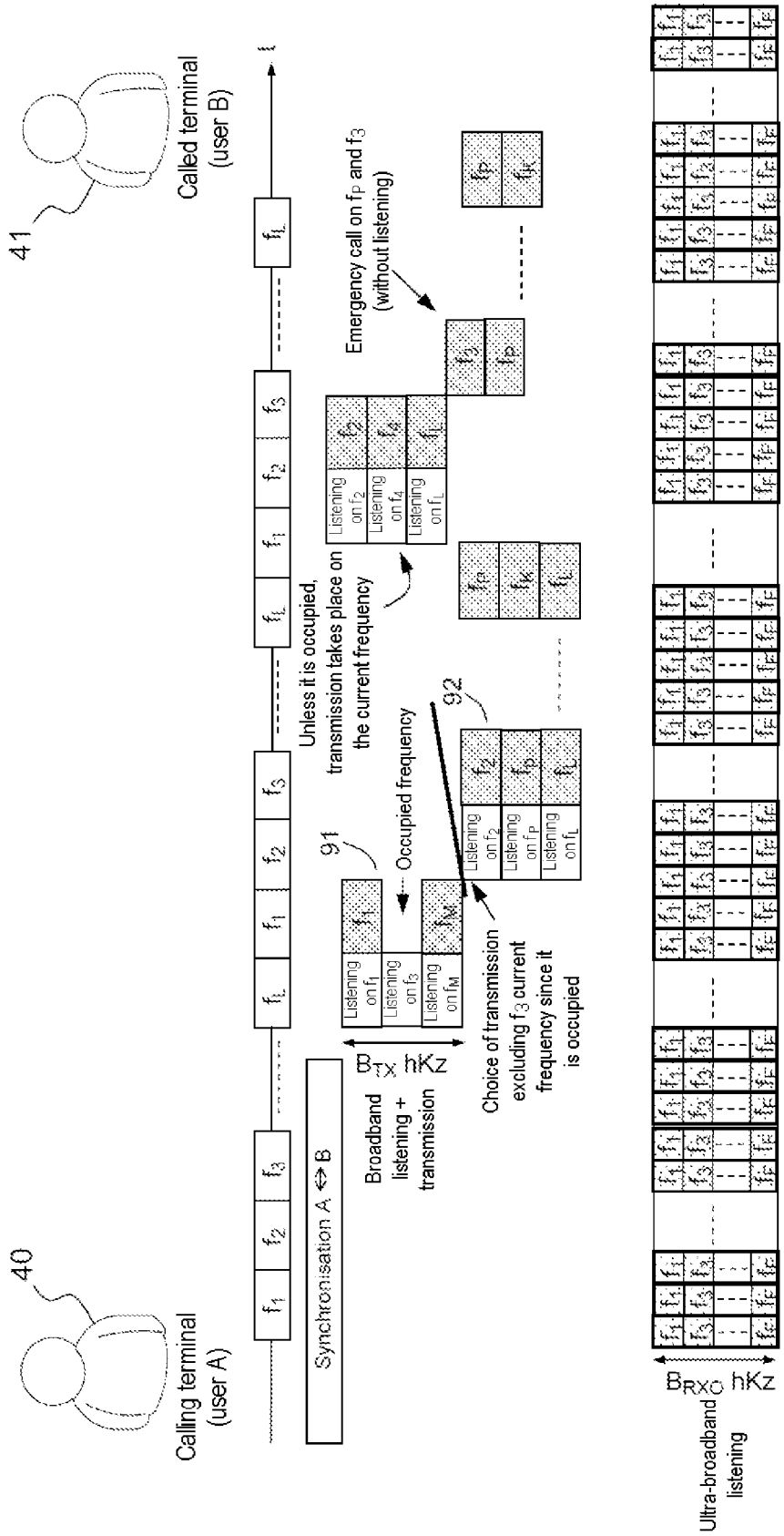
FIG. 9 shows a basic diagram of the call in ALE XL.

FIG. 8 shows a case of use for a broadband transmit channel. In this case, the calling terminal is able to transmit simultaneously on a plurality of frequencies in its transmit band $B_i$.

The calling terminal has a broadband listening and transmit capability and the called terminal has a broadband listening capability. The calling terminal will exploit its broadband listening and transmit capability to implement a plurality of LBTs in parallel: listening, 81, on $f_1, f_3, f_M$, to decide on calls that it can make (unoccupied frequencies) and then call, 82, on the available frequencies $f_1, \ldots, f_M$ in the example, thus multiplying the chances of being detected by the called terminal. In order to continue to be detected by a narrowband called terminal, the calling terminal takes care always to include the standard frequency $f_i$ in its plan, except if the latter is occupied, in which case it will then possibly be accepted to transmit on a different band that is more favourable and compatible with the broadband receive capability of the called terminal. In the example, the calling terminal can thus be seen to switch over to $f_2, f_P, f_L$ since $f_3$ is occupied, 83.

FIG. 9 shows the case where the receive band $B_{RX}$ is greater than or equal to the total band, including all of the F frequencies of S, enabling a continuous broadband listening. The receiver covers all of the frequencies of the plan, and therefore listens systematically on all the frequencies.

The calling terminal scans the available frequencies of the frequency plan and, in the example, it determines, for example, that the frequency $f_3$ is occupied, 91, and the calling terminal will therefore make a transmission choice excluding the frequency $f_3$, the current frequency which is occupied. It will therefore switch over, 92, to listen on $f_2, f_P$ and $f_L$, and, if the frequencies are available, it will transmit on these frequencies. Emergency calls are still conceivable without prior listening. The called terminal will listen on the entire band $f_1, f_3, \ldots, f_F$.

ADVANTAGES

The method according to the invention notably offers the advantage of speeding up the link establishment through a parallelisation of the processing operations and, in some cases, through the application to a narrowband terminal of a fallback strategy to a frequency more suitable for establishing the link. Furthermore, the broadband capability may enable the selection of a higher-quality frequency in the time of, or even in a time shorter than, the standard narrowband procedure.

The invention claimed is:

1. A method for improving a High Frequency (HF) band link establishment in a communication system including one or more transmit terminals or calling terminals and one or more receive terminals or called terminals, at least one of the calling or called terminals having a broadband capability, comprising at least the following steps:

creating call bands and listening bands according to the broadband transmit and/or receive capabilities, the number of frequencies being known, the minimum number of bands being suitable for covering the entire frequency plan, minimising the number of bands and then maximising the number of frequencies in each of transmit bands $B_i$ distributing the bands $B_i$ regularly in time in order to minimise the intermediate listening time between two frequencies, at available temporal positions close to a regular subdivision, and allocating a frequency $f_j$ to each band $B_i$ in order to define a standard frequency plan for the operation of the system, transmitting/receiving in broadband mode, by checking that the selected transmit frequencies are not already in use.

2. The method according to claim 1, wherein the bands are distributed by arranging them in descending cardinal-value order and placing the bands in frequency positions defined by $$i + \left\lfloor k \times \frac{F}{\mathrm{card}(B_i)} \right\rfloor$$

or in a free position as close as possible to this value, where F is the number of frequencies of the frequency plan, i is an index that varies from 1 to t number of defined bands, k varies from 0 to $K_{i-1}$, where $K_i$ is the number of frequencies in the band $B_i$.

3. The method according to claim 1, wherein, in the case of frequency bands which overlap, the bands are distributed by prioritising the bands with the highest cardinal value.

4. The method according to claim 1, wherein, if the bands overlap, the bands are arranged by prioritising the bands with the lowest cardinal values.

5. The method according to claim 1, wherein the steps are carried out for the calling terminals and called terminals.

6. The method according to claim 5, wherein, in the case of a broadband transmit and receive application, each narrowest frequency band located on the transmit (or respectively the receive) side must be contained in the broadest band located on the receive (or respectively the transmit) side.

7. The method according to claim 1, wherein, in the case of an asynchronous link establishment and a broadband capability in the calling terminal, a prediction phase is applied in order to scan the frequency plan according to the highest probability of the frequencies being available.

8. The method according to claim 1, wherein the calling terminal has a broadband transmit capability and, following a Listen Before Transmit (LBT) listening phase on a transmit band $B_i$, the calling terminal transmits its call over all of the card($B_i$) frequencies $f_K$ which are located in the transmit band $B_i$ and have not been detected as occupied.

9. The method according to claim 7, wherein the called terminal also has a broadband capability and, having detected a plurality of call frequencies, it determines the frequency on which it will reply by choosing the highest-quality frequency or the frequency that is recommended in the use of the system.

10. The method according to claim 8, wherein the called terminal also has a broadband capability and, having detected a plurality of call frequencies, it determines the frequency on which it will reply by choosing the highest-quality frequency or the frequency that is recommended in the use of the system.

11. The method according to claim 1, wherein, in the case of a synchronous call with a narrowband calling terminal, a capability to switch over to transmit on a different frequency is introduced if the current frequency is not available.

12. The method according to claim 1, wherein, for a synchronous call with a broadband calling terminal, the method transmits simultaneously on a plurality of frequencies found to be free during a Listen Before Transmit (LBT) listening phase in the transmit band including the standard synchronous frequency.

13. The method according to claim 12, further comprising a mechanism for switching over to transmit on a different band not including the unavailable standard synchronous frequency.

14. The method according to claim 11, wherein the called terminal also has a broadband capability and, after having detected a plurality of call frequencies, it determines the frequency on which it will reply by choosing the highest-quality frequency or the frequency that is recommended in the use of the system.

* * * * *